United States Patent [19]

Gessner et al.

[11] Patent Number: 4,693,913

[45] Date of Patent: Sep. 15, 1987

[54] METHOD AND APPARATUS FOR THE LOSS-FREE INTRODUCTION OF BINDING AGENTS INTO MINERAL WOOL FLEECES

[75] Inventors: Dieter Gessner; Rainer Steckert, both of Bad Berka, German Democratic Rep.

[73] Assignee: VEB Zementkombinat, Dessau, German Democratic Rep.

[21] Appl. No.: 849,315

[22] Filed: Apr. 8, 1986

[30] Foreign Application Priority Data

May 6, 1986 [DD] German Democratic Rep. .................................. 2759904

[51] Int. Cl.$^4$ .......................... B05D 7/00; C03B 37/04
[52] U.S. Cl. ..................................... 427/215; 65/4.4; 118/303; 156/62.8; 264/112
[58] Field of Search ............................. 65/3.1, 4.4, 9, ; 118/303; 156/166, 180, 181, 62.8; 427/212, 215; 501/36; 264/112

[56] References Cited

U.S. PATENT DOCUMENTS

| | | | |
|---|---|---|---|
| 3,331,669 | 7/1967 | Sinclair | 65/4.4 |
| 3,819,441 | 6/1974 | Fargo et al. | 65/4.4 X |
| 4,463,048 | 7/1984 | Dickson et al. | 65/4.4 X |

*Primary Examiner*—Michael R. Lusignan
*Attorney, Agent, or Firm*—Jordan and Hamburg

[57] ABSTRACT

The invention relates to the manufacture of mineral fiber products or similar fibrous materials, in which fleece formation occurs in a continuous process in a fiber collecting chamber and in which, in order to obtain specific strength characteristics, there are added binding agents. According to the invention, and in contrast to the known methods, a thin fiber fleece is formed at first without addition of a binding agent in a suction chamber and is then transported into a subsequent spraying and collecting chamber which is completely separated from the suction chamber. In the spraying and collecting chamber, the fibers of the thin fleece, after leaving the suction chamber, freely fall downwardly onto a collecting belt, where they accumulate into a crude fiber fleece for further processing. During the free fall, the fibers are sprayed with a binding agent added in optimum quality, mixture and dosaging. Excess binding agent is collected under the collecting belt and is recycled to the manufacturing process after being worked up.

15 Claims, 1 Drawing Figure

METHOD AND APPARATUS FOR THE LOSS-FREE INTRODUCTION OF BINDING AGENTS INTO MINERAL WOOL FLEECES

The invention relates to a method and the apparatus pertaining thereto for the loss-free introduction of binding agents into mineral wool fleeces or similar fibrous materials. It can be used in all equipment in which, in order to attain specific quality characteristics of the end-products, there are added binding agents to the fibers and the fiber fleece formation takes place in a continuous process in a fiber depositing chamber.

BACKGROUND OF THE INVENTION

The binding agent feed in the production of fibrous products is realized according to the following methods.

In the fiber formation according to the centrifugal method, a molten jet which is continuously leaving the melt unit is pulled into fibers by means of the centrifugal force of one or more centrifuging wheels. The fibers are conveyed by an air or gas stream acting approximately parallel to the axis of the centrifuging wheels into a subsequent fiber depositing chamber and are aspirated onto an endless wire net conveyor belt which is permeable to air. For the wetting of the fibers with binding agent during fiber blow-off, a fine binding agent spray is sprayed on the fibers according to the so-called spray-type method by means of binding agent nozzles which are arranged in the same plane as the air outlet ducts. Depending on the method, those portions of the melt which are not fiberized, which fall as waste into a conveyor trough located below the disintegrating unit, are wetted with binding agent, so that already at this point, there result considerable binding agent losses.

Furthermore, only a portion of the binding agent entering into the fiber depositing chamber is utilized for the wetting of the fibers, whereas the remaining portion, due to the effect of the aspiration, is transported into the atmosphere or the subsequently coupled filter or cleaning equipment or settles on the parts of the equipment and leads to great fouling of the entire fiber depositing chamber, the transport belt, as well as the suction ducts. Some of the deposits which form on the walls of the fiber depositing chamber become detached again and cause an inferior quality or occlusion of burned spots in the finished products.

Over all, according to experience, the aforementioned binding agent losses amount up to 40% of the quantity used. Besides the increased expenditures for the quantities of binding agent which have to be used, it also results in great environmental pollution, because the binding agents which are used all over the world contain harmful substances, consequently necessitating high expenditures for cleaning equipment in order to reduce the environmental pollution.

The losses are especially high if very thin fiber fleeces are accumulated, such as, for example, in the fiber fleece formation according to the pendulum-type principle or when the product type which subsequently has to be manufactured required these thin fiber fleeces.

In order to reduce the binding agent losses which occur already within the confines of the fiber formation, in some cases, variations of the spraying method are used, wherein binding agent nozzles are arranged inside of the fiber depositing chamber. Our own tests have shown, however, that this very frequently leads to interruptions of the binding agent feed because of fouling of the nozzles, even if corresponding covers are provided, and a further deterioration of the already insufficient ability to control the binding agent distribution in the fiber fleece.

As a second method for the binding agent feed there is known the center-spray-type, whereby a specially constructed, funnel-shaped distributor nozzle is mounted on one of the centrifuging wheels and the feed of the binding agent occurs via a hollow shaft extending through the axis of the centrifuging wheel.

Although this method also avoids the losses due to wetting of components of the melt which are not fiberized and which do not reach the fiber depositing chamber, the other disadvantages of the above-mentioned spray-type method remain in effect in the same way. In addition, there is a high susceptibility to interruptions which makes a widthwise application impossible.

A third method of the binding agent introduction is the so-called wet-type method whereby, after leaving the fiber depositing chamber, the fiber fleece is soaked with binding agent. The wet-type method is predominantly used with equipment whereby the fiber formation occurs according to the blast drawing method which, because of technical reasons, excludes the utilization of the spray-type method for the binding agent feed. In comparison to the other methods, the wet-type method has several advantages (attaining higher binding agent contents, no losses during the introduction of the binding agent, better binding agent distribution). However, it has the disadvantage that it requires for most of the product types a strong dilution of the binding agent in order to assure the desired binding agent contents in the finished products. Because of the necessarily high moisture content in the crude fiber fleece, the energy expenditures for the subsequent drying and curing process and, therefore, also the system-technical expenditures increase many times.

For this reason, the wet-type method is only used with manufacturing equipment of a low throughput performance for the manufacture of particular special products. Additional disadvantages result, furthermore, in that because of the great dilution of the binding agent, there also have to be accepted certain quality reductions as well as a limited choice of binding agents which can be used.

Summary of the Invention

The object of the invention is to provide a method and a corresponding apparatus for the introduction of binding agents in mineral wool fleeces which, in comparison to the up to now known spray-type methods and the center-spray-type method, assure an improved binding agent distribution in the fiber fleece as well as prevent binding agent losses during the introduction of the binding agent with the resulting disadvantages thereof, such as, increased expenditures for binding agent,
high degree of environmental pollution, correspondingly high expenditures for protective measures for conserving the environment,
heavy fouling of the equipment and therewith connected high expenditures for cleaning and maintenance services, as well as
quality reductions of the products due to intercalation of impurities and/or burned spots in the first fleece.

Furthermore, there should result additional advantages from the following:
increase of the quality and resulting enlargement of the product variety,
improvement of the process control, reduction of the specific energy input for the curing of the binding agent, as well as
enlargement of the variety of binding agents which can be used.

The oject of the invention is to overcome the disadvantages of the known technical solutions for the binding agent feed and, furthermore, to obtain additional advantages for the technological processes subsequent to the fleece formation and for the quality of the mineral fiber products to be manufactured.

The cause of the deficiencies of the known solutions are that, on the one hand, the feed of the binding agents occurs in the same process step as the fiber fleece formation (spray-type method, center-spray-type) and, on the other hand, in the wet-type method, depending upon the method and the substances, there have to be introduced increased proportions of moisture into the fiber fleece, because in order to wet the manufactured crude fiber fleece, a complete impregnation with an aqueous solution of the binding agent is required.

In comparison, according to the invention, in a suction chamber without simultaneous binding agent feed, an even but very thin fiber covering is at first formed on a continuously conveying suction belt and is then conveyed into a subsequent chamber which is separated from the suction chamber, in which the thin fiber covering dissociates again and the fibers are moved downwards by gravitational force and deposited on a collecting belt.

During the downward movement, the fibers are sprayed evenly and in the defined concentration and quantity with binding agent. According to the desired thickness of the crude fiber fleece wetted with binding agent, which is required for the further processing, the belt speed of the collecting belt is correspondingly slowed down.

Binding agent which does not reach the fibers is caught below the collecting belt, worked up and recycled to the production process.

Usually, an evenly distributed fiber covering is guaranteed by a one-time setting of the blowing, suction and belt speed in the suction chamber and the connecting in of automatic belt speed control equipment, because the depositing onto the suction belt can be kept constant for all varieties and the necessary changes can be set by the speed of the collecting belt.

BRIEF DESCRIPTION OF THE DRAWINGS

The present invention will be better understood by reference to the accompanying drawing, which is a side schematic view illustrating an apparatus for carrying out the method of the present invention.

DETAILED DESCRIPTION OF THE PREFERRED EMBODIMENT

EXEMPLARY EMBODIMENT

Figure 1:
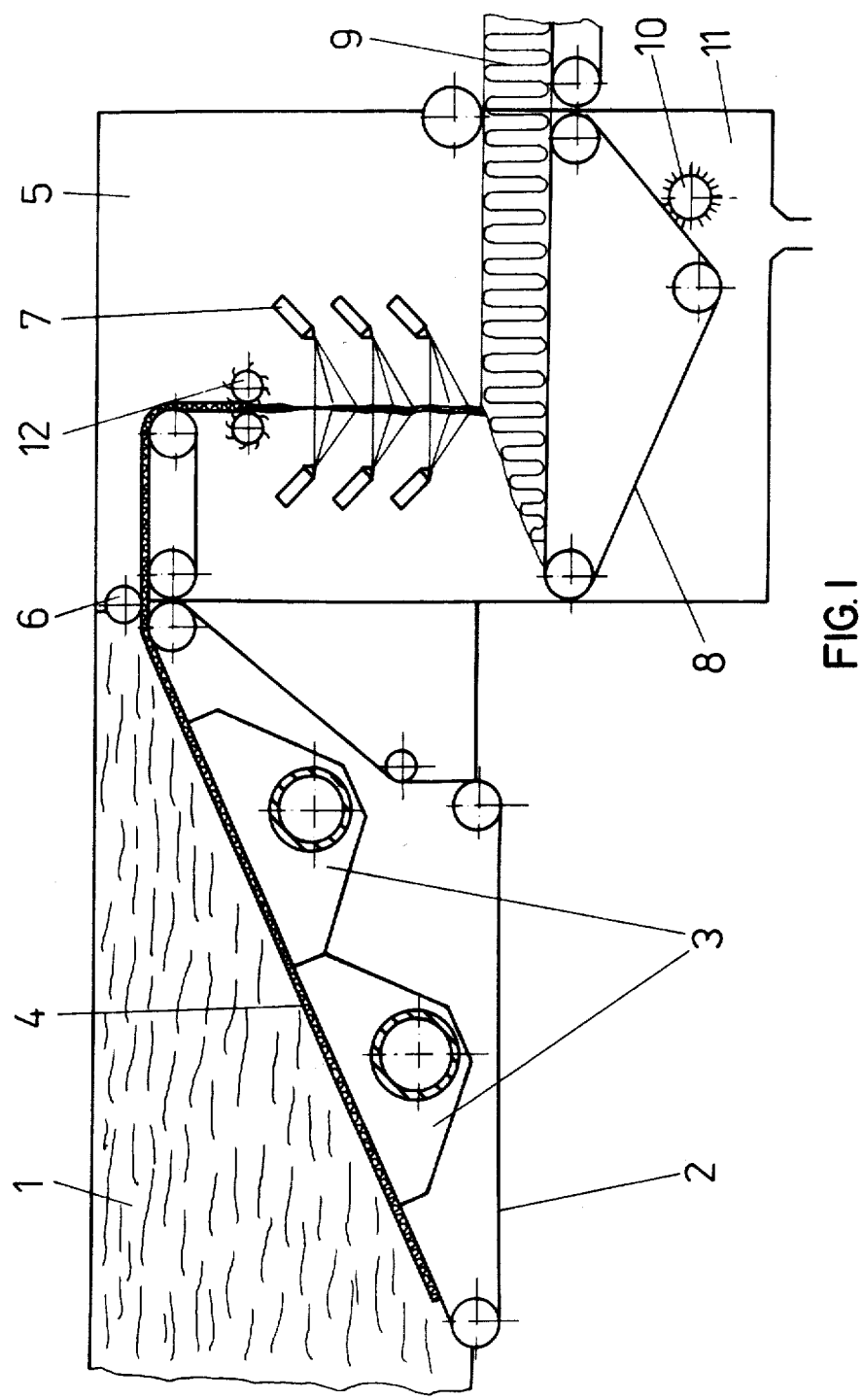

Fibers, which are manufactured in the conventional way, are stabilized in a suction chamber 1 without addition of binding agent and are associated on a suction belt 2 into a thin fiber fleece 4 by means of air.

Subsequently, the thin fiber fleece 4 is conveyed to a spraying and collecting chamber 5 which is entirely separated from the suction chamber 1. Because the suction belt 2 extends upwards on a slant, there is a corresponding level difference between the two belts, so that it is possible to convey the fibers of the thin fiber fleece 4 soley by free fall by gravitational force onto a collecting belt 8 in the spraying and collecting chamber 5.

In order to assure that the thin fiber fleece 4 disassociates into its individual fibers or fiber agglomerates, there is the possibility to connect at the outlet side of the suction belt 2 a fiber preparation apparatus 12, which can be switched on or switched off depending on the desired degree of disassociation of the fibers. This disassociation of the thin fleece 4 has the effect that during the free fall the fibers are evenly sprayed with binding agent by respectively arranged binding agent nozzles 7 which, according to the up to now known methods was either not possible, or possible only unevenly, because of the prevailing conditions in the fiber depositing chamber.

The fibers then collect on the aforementioned collecting belt 8, whose speed is regulated such that a respectively thick crude fiber fleece 9 is attained which corresponds to the requirements of the further processing and which is continuously conveyed. The subsequent working steps are in accordance with the state of the art technology.

Because of this method, it is possible for all of the varieties of the finished products to be manufactured, to adjust the conditions in the suction chamber 1 once and to keep them at this setting.

The required variations of the thickness of the finished crude fiber fleect 9 for the most varied finished products are effected exclusively via the change of the transport speed of the collecting belt 8.

The tie-in of the two belts 2, 8 in the usual automatic belt speed regulation apparatus for the compensation of performance fluctuations of the melt unit are not affected by this measure.

With the method of the invention, it is possible that the binding agent which does not reach the fibers is caught below the collecting belt 8, then worked up again and recycled to the production process.

The high binding agent losses in the usual fiber depositing chamber depending on the common technology, which in addition to the considerable expenditures also caused considerable environmental pollution, are completely avoided by the method according to the invention. Furthermore, the quality of the crude fiber fleece and, therefore, also the quality of the end product, are considerably increased by means of spraying the fibers without causing turbulence in the spraying and collecting chamber 5, because the fibers are much more evenly wetted with binding agent than used to be possible in the conventional fiber depositing chamber.

The method according to the invention, furthermore, also has the advantage that because of the new technology, and the therewith changed conditions during the spraying of the fibers in the spraying and collecting chamber 5, the binding agent can be used without diluting it with water or other suitable reagents, whereby the crude fiber fleece receives considerably less moisture and, therefore, brings about a considerable relief of the load on the curing chamber with corresponding energy savings.

The apparatus which was developed for the execution of the method according to the invention has particular characteristics.

The utilized suction chamber 1 essentially differs in its embodiment from the known fiber depositing chambers only by its slanted arrangement of the suction belt 2 which has correspondingly adapted suctioning ducts 3 within the endless belt, as well as a considerably higher belt speed in order to attain a thin fiber covering 4. The division of the suction ducts 3 for the regulation of the fiber distribution is also analogous to conventional equipment. However, for the improvement of the regulating options, a division into smaller compartments than in the past is provided, because the previously needed space requirements for cleaning purposes no longer need to be taken into consideration.

The subsequent spraying and collecting chamber 5 is completely separated from the aspiration chamber 1. In order to avoid an undesired air exchange between the two chambers 1, 5 (not beyond negligible quantities), the transition point is provided with an adjustable seal 6 which, for example, can be configured as a roll. In order to make sure fouling of the suction belt 2 is avoided, it is possible to connect a short, preferably horizontally arranged transfer belt after the suction belt 2 which transfer belt extends with its end into the spraying and collecting chamber 5.

For the introduction of the binding agent, high pressure nozzles are preferably used, in order to avoid, or at least to minimize, suctioning devices inside the spraying and collecting chamber 5.

The binding agent nozzles 7 are arranged depending on their spray cone such that the free falling fibers are being evenly sprayed from two sides. It is advantageous that the binding agent nozzles 7, according to desired binding agent content for the different variations, are layed out so that they can be switched off or on. The regulation of the quantity of spray according to the desired finished product takes place by way of the number of the nozzles, the pressure and the diameter of the opening of the nozzles, in consideration of the consistency of the binding agent which depends on the formulation.

The spraying direction can be perpendicular to the fibers moving in free fall; however, it is more advantageous to spray obliquely downwardly, so that the fibers are not whirled about by the spraying pressure, but rather are assisted in their natural movement direction. The nozzles are, moreover, adjusted such that the row of nozzles spraying counter the production direction is spraying downwardly at a steeper incline, in order to blow as little binding agent as possible on the partition wall of the two chambers 1, 5, whereas the other row of nozzles is spraying at a less steep incline, in order to distribute the excess binding agent on the collected crude fiber fleece 9.

After the fibers are sprayed with binding agent, they accumulate on the collecting belt 8 and form the finished crude fiber fleece 9, which continues to be conveyed out of the spraying and collecting chamber 5 to the curing chamber. The speed of the collecting belt 8 is varied according to the type of product to be manufactured and is slower or, at maximum, equal to the speed of the suction belt 2.

The collecting belt 8 is designed as a perforated conveyor belt under which there is located a collecting vessel 11, in which the binding agent which does not reach the fibers is caught. After being worked up, the excess binding agent is recycled to the manufacturing process. A belt cleaning device 10 serves for keeping the collecting belt 8 clean.

In addition to the described embodiment, a configuration of the suction chamber in the conventional way with an approximately horizontally arranged suction belt is also possible; however, in that case, the subsequent components of the manufacturing equipment have to be positioned accordingly further down according to the height of the spraying and collecting chamber.

What we claim is:

1. A method for the loss-free introduction of binding agents into mineral fiber fleeces comprising,
    forming a thin fiber-fleece of mineral fibers not containing any binding agent on a suction belt in a suction chamber;
    subsequently conveying the thin fiber fleece into a spraying and collecting chamber completely separated from the suction chamber;
    disassociating the thin fiber fleece into individual fibers and fiber agglomerates by means of gravitational force in a free-fall area of the spraying and collecting chamber;
    evenly spraying a binding agent onto free-falling individual fibers and fiber agglomerates in the spraying and collecting chamber; and
    collecting the sprayed, free-falling individual fibers and fiber agglomerates on a collecting belt travelling at a speed necessary to form a crude fiber fleece having a thickness required for further processing.

2. A method according to claim 1, wherein suction in the suction chamber remains constant and the thin fiber fleece is conveyed to the spraying and collecting chamber at a constant speed.

3. A method according to claim 2, further comprising varying the thickness of the crude fiber fleece solely by varying the speed of the collecting belt.

4. A method according to claim 3, further comprising automatically regulating suction belt and collecting belt speeds to compensate for performance fluctuations.

5. A method according to claim 1, further comprising collecting excess sprayed binding agent underneath the collecting belt, working-up the collected binding agent and recycling worked-up binding agent to the spraying step.

6. An apparatus for the loss-free introduction of binding agents into mineral fiber fleeces comprising,
    a suction chamber;
    a spraying and collecting chamber completely separated from the suction chamber;
    an air-permeable suction belt arranged at an angle in the suction chamber having suction boxes with suction ducts associated therewith for stabilizing and collecting fibers without binding agent into a thin fiber fleece and conveying the thin fiber fleece to the spraying and collecting chamber;
    a free-fall zone in the spraying and collecting chamber for disassociating the thin fiber fleece into individual fibers and fiber agglomerates by gravity;
    a plurality of binding agent nozzles arranged in the spraying and collecting chamber beneath the free-fall zone for spraying free-falling fiers and fiber agglomerates disassociated from the thin fiber fleece with binding agent; and
    a collecting belt arranged in the spraying and collecting chamber beneath the binding agent nozzles for collecting and forming the sprayed, free-falling fibers and fiber agglomerates into a crude fiber fleece.

7. An apparatus according to claim 6, further comprising a drip vessel arranged under the collecting belt for collecting excess binding agent and a belt cleaner for cleaning the collecting belt.

8. An apparatus according to claim 6, wherein the collecting belt is arranged horizontally in the spraying and collecting chamber.

9. An apparatus according to claim 6, further comprising a short transfer belt located between the suction belt and the spraying and collecting chamber for transferring the thin fiber fleece from the suction belt to the free-fall zone in the spraying and collecting chamber.

10. An apparatus according to claim 6, further comprising means for adjusting the binding agent nozzles to various angles slanting downward in the spraying and collecting chamber.

11. An apparatus according to claim 6, wherein the plurality of binding agent nozzles are arranged at different heights in the spraying and collecting chamber on both sides of the free-falling fibers and fiber agglomerates for evenly spraying the free-falling fibers and fiber agglomerates with binding agent from two sides.

12. An apparatus according to claim 11, further comprising means for individually switching the binding agent nozzles on and off.

13. An apparatus according to claim 6, further comprising fiber preparation means arranged in the free-fall zone above the plurality of binding agent nozzles in the spraying and collecting chamber for further disassociating the thin fiber fleece conveyed from the suction belt into individual fibers and fiber agglomerates; and means for turning the fiber preparation means on and off.

14. An apparatus according to claim 6, further comprising a pair of rollers arranged under an end of the suction belt for crushing larger solid particles in the thin fiber fleece while passing fibers unhindered.

15. An apparatus according to claim 6, wherein the suction belt is arranged horizontally in the suction chamber.

* * * * *

UNITED STATES PATENT AND TRADEMARK OFFICE
CERTIFICATE OF CORRECTION

PATENT NO. : 4,693,913
DATED : September 15, 1987
INVENTOR(S) : Dieter Gessner et al It is certified that error appears in the above-identified patent and that said Letters Patent are hereby corrected as shown below:

On the title page

In the "Foreign Application Priority Data",

"May 6, 1986" should read --May 6, 1985--.

Signed and Sealed this

Twenty-first Day of June, 1988

Attest:

DONALD J. QUIGG

*Attesting Officer*  *Commissioner of Patents and Trademarks*